US006955293B1

(12) United States Patent
Katsanevas

(10) Patent No.: US 6,955,293 B1
(45) Date of Patent: Oct. 18, 2005

(54) BANK CARD TERMINAL COVER

(76) Inventor: Mike Katsanevas, 3190 S. Highland Dr., Salt Lake City, UT (US) 84106

(*) Notice: Subject to any disclaimer, the term of this patent is extended or adjusted under 35 U.S.C. 154(b) by 0 days.

(21) Appl. No.: 09/611,073

(22) Filed: Jul. 6, 2000

Related U.S. Application Data

(63) Continuation-in-part of application No. 09/131,352, filed on Aug. 10, 1998, now abandoned, which is a continuation-in-part of application No. 08/786,564, filed on Jan. 17, 1997, now abandoned.

(51) Int. Cl.[7] .................................................. G06F 17/60

(52) U.S. Cl. ........................................ 235/379; D14/440

(58) Field of Search .................................. 235/379, 380, 235/382, 383; 902/22, 25–27, 30–31; 361/681, 680; 400/713, 714; D14/440–446

(56) References Cited

U.S. PATENT DOCUMENTS 2,263,946 A * 11/1941 Fletcher ........................ 16/267
D237,754 S * 11/1975 Ray, Jr. ...................... D14/440
4,084,214 A * 4/1978 Eppich
4,493,524 A * 1/1985 Kaplan et al.
4,727,934 A * 3/1988 Eckel et al.
5,163,870 A * 11/1992 Cooper ........................ 454/184
5,249,103 A * 9/1993 Frosythe
D349,893 S * 8/1994 Bennet
5,438,184 A * 8/1995 Roberts et al.
5,576,516 A * 11/1996 Kameyama et al. ...... 174/138 F
5,682,993 A * 11/1997 Song ........................... 206/320

FOREIGN PATENT DOCUMENTS

JP 08-194798 * 7/1996
JP 11316622 A * 11/1999 ............. G06F/1/16

* cited by examiner

*Primary Examiner*—Diane I. Lee
(74) *Attorney, Agent, or Firm*—Marcus G. Theodore

(57) ABSTRACT

A rigid transparent crush resistant bank card terminal cover having a liquid, dust, and grease impervious top with sides defining an open bottom leading into an interior sized to fit about and cover a bank card terminal when placed upon a support surface, the sides defining at least one opening through which a terminal cord may be inserted and connected to the bank card terminal.

6 Claims, 4 Drawing Sheets

BANK CARD TERMINAL COVER

RELATED APPLICATIONS

This application is a continuation-in-part application of the application Ser. No. 09/131,352 filed Aug. 10, 1998, now abandoned; which is a continuation-in-part of the originally filed application entitled "Bank Card Terminal Cover", Ser. No. 08/786,564, filed Jan. 17, 1997, now abandoned.

BACKGROUND OF THE INVENTION

1. Field

This invention relates to covers. More particularly, it provides a crush resistant cover for a bank card terminal processing machine.

2. State of the Art

Numerous retailers utilize bank card processing terminals to pay for item sales. These bank card processing terminals are fairly sensitive to environmental hazards. They have card slots leading into the interior of the bank card terminal electronic circuitry to electronically read the information on the magnetic strips of customer bank cards. This information is then transmitted via cables operably associated with telephone lines leading to a main computer processor. These bank card processing terminals also include a key pad below a display screen to alternatively manually input a customer's bank card data and the amount of the sale. Presently there is no good protective device to prevent accidental contact damage to or environmental exposure of the bank card terminal. For example, some bank card terminal processing machines have a transparent plastic key pad cover covering the keys. These do not prevent dust, grime, grease, liquids, and food from accumulating in the card slot reader, causing damage to the electronics. These transparent plastic key pads become brittle and opaque through age and do not prevent damage to the terminals if accidentally hit by an object. Therefore, usage of these bank card terminal machines is generally restricted to a retailer's indoor office areas.

Other soft flexible plastic covers are used to cover the bank card terminal to prevent dust, grime, grease, liquids, and food from causing damage to the electronics. However, these soft plastic covers do not prevent accidental crushing of the bank card terminals.

One device, Eppich discloses an impervious modular crush resistant container into which electronic components are sealed therein to provide a rugged modular housing unit for protecting the electronic circuitry contained therein. As a sealed container, Eppich is unsuited for use as a bank card terminal container, which requires exposure of the internal circuitry via a card slot to read the magnetic strips of bank cards inserted therein. Eppich also does not shield the Eppich is absorbed by the modular container itself. This can cause cracking or distortion of the container, which may affect the internal electrical component alignment.

There thus remains a need for a crush resistant cover with a closed top and extending sides defining an open bottom, which extends about and around bank card terminals to protect them from falling objects, liquids, dust, and grease. The invention described below provides such a device for fast food restaurants, auto repair shops, and other retailers wherein heavy objects and dust, grime and grease are routinely encountered near sales counters or for outdoor use.

SUMMARY OF THE INVENTION

The invention comprises a crush resistant terminal cover with sides defining an open bottom sized to fit about and over a bank card terminal processing machines having accessible card reading slots and keyboards, which are pervious to liquids, dust and grease. The cover is constructed of a rigid crush resistant material, which is also resistant to liquids, dust, and grease. The terminal cover has a top and sides which define an opening leading into an interior space, which fits about and accommodates a bank card terminal placed on a support surface. The sides of the cover contact the support surface to transfer the force from an accidental blow away from the bank card terminal and onto the support surface. The sides have at least one opening through which telephone terminal cords may be inserted and connected to the bank card terminal. The perimeter of the opening defined by the cover sidewalls may include a shock absorbing seal to keep out liquids, dust and grease. This shock absorbing seal enables to cover to me made of a lighter weight material while still protecting the terminal cover To use the simplest embodiment, the cover is simply placed over a bankcard terminal lying on a table, counter, or other support surface, when not in use. To utilize the bankcard terminal, the cover is then lifted and removed to access the bank card slot and keyboard. If desired, a handle may be included on the top exterior of the cover to aid in its removal and replacement.

Preferably, the cover is made of single piece construction made of a lightweight rigid material, such as nylon, plastic, or other rigid materials, which prevent accidental damage to the bankcard terminal. These materials are readily injection molded into the desired shape to form a cover of single piece construction. To insure that the terminal is online, preferably the cover is constructed of a transparent material to enable visual inspection of the terminal display.

In one preferred embodiment for wall mounted bank card terminals, the cover has attachment means, such as corresponding hook and loop strips or hinges associated with the top of the bank card terminal to swing in a first mode to provide access to a bank card terminal key pad and card reading slot. The cover is then closed over the bank card terminal when not in use in a second mode to contact the wall support sure and prevent accidental contact and damage from dust, grime, liquids, or other matter, which interfere with the bank card terminal key pad and card reading slot electronics. This embodiment may also include a shock absorbing seal around the bottom of the opening similar to that described above.

In another embodiment for use with the outdoors, the cover may include a bottom openably attached to the cover to provide required access to the bankcard terminal, while protecting the bankcard terminal from exposure to the elements. To prevent being blown off by the wind, the cover may be weighted, or attached to the terminal with hook and loop strips as described above.

DESCRIPTION OF THE ILLUSTRATED EMBODIMENTS

Figure 1:
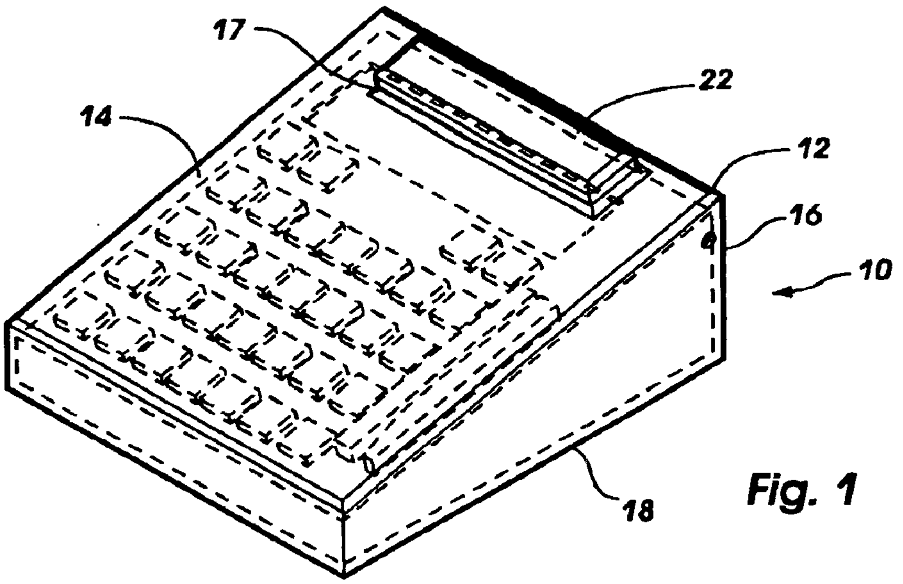
FIG. 1 illustrates a perspective view of one preferred embodiment of the invention.

FIG. 1 illustrates the simplest embodiment of the invention 10 which comprises a transparent crush resistant terminal cover 12 with a top 14 and sides 16 defining an open bottom 18 structured and sized to fit over a bank card terminal processing machine. The cover 12 has hook and loop strips 17 attached to its underside, which adhere to corresponding hook and loop strips 17 attached to the top of the bank card terminal processing machine.

The cover 12 material is also resistant to liquids, dust, and grease. The sides 16 fit about and cover the bankcard terminal when placed over the terminal on a support surface. The sides 16 of the cover 12 contact the support surface to transfer the force from an accidental blow away from the bank card terminal and onto the support surface. The sides 16 have at least one opening 20 shown in FIG. 2 through which telephone terminal cords may be inserted and connected to the bank card terminal.

To use this embodiment, the cover 12 is simply placed over the bank card terminal when not in use. To utilize the bankcard terminal the cover 12 is removed to access the bankcard slot and keyboard. If desired, a handle 22 may be included on the top 14 exterior of the cover 12 to aid in its removal to access the bank card terminal key pad and card slot.

Figure 2:
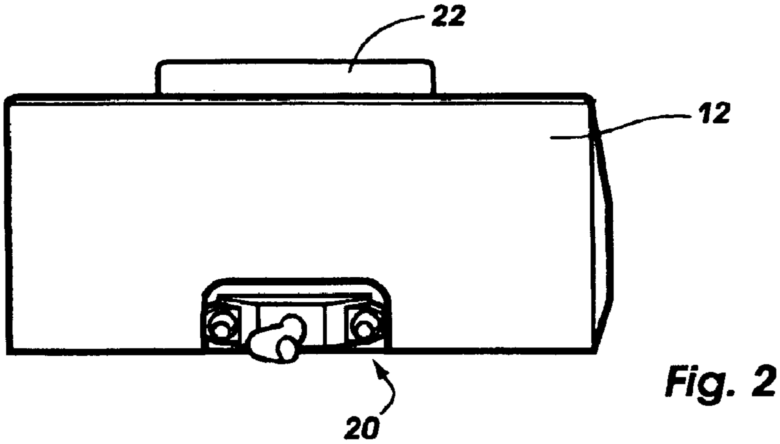
FIG. 2 illustrates a rear view of the embodiment of the invention shown in FIG. 1.
Figure 2A:
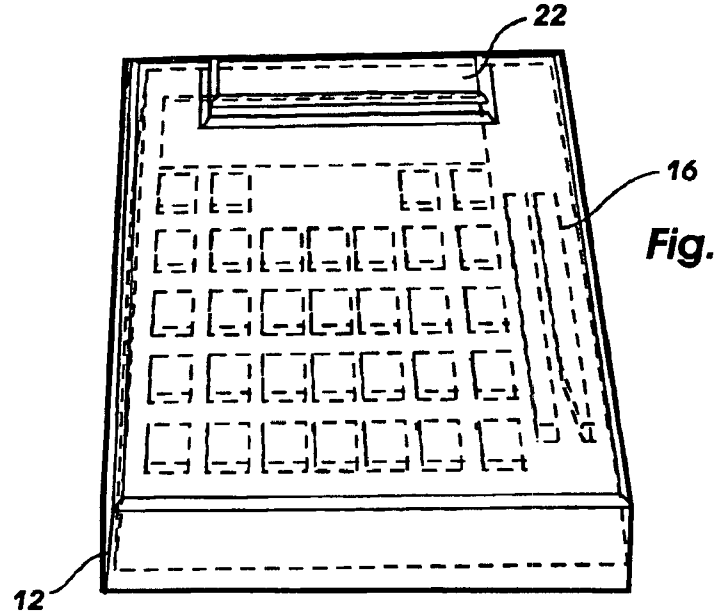
FIG. 2*a* illustrates a top view of a preferred embodiment of the invention.
Figure 2B:
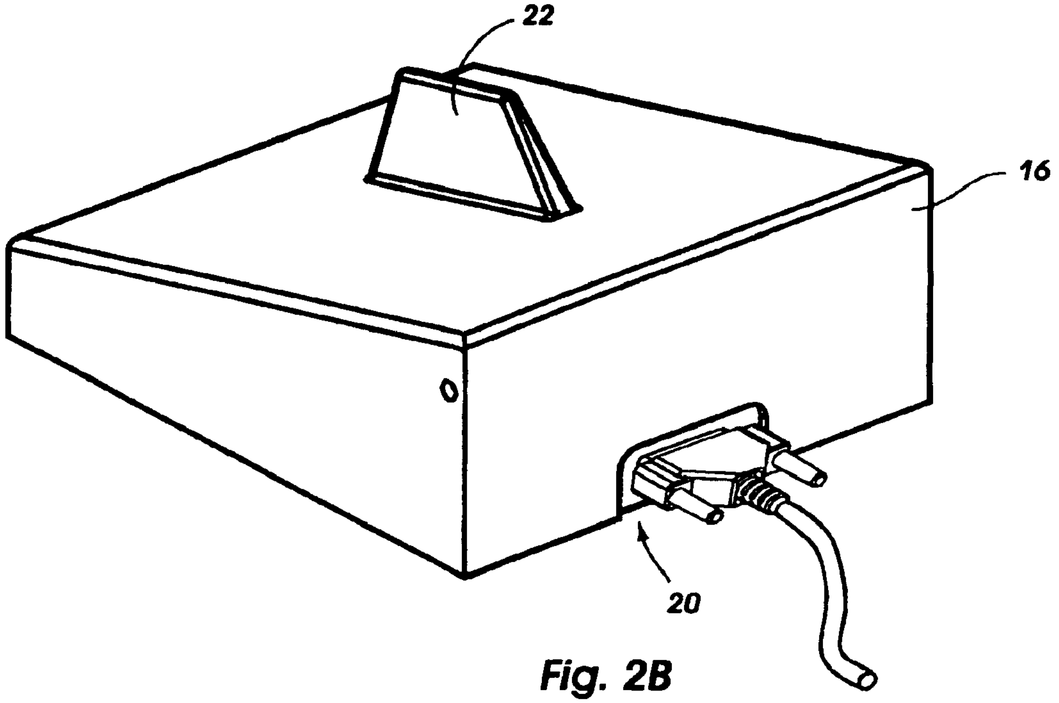
FIG. 2*b* illustrates a rear view of the embodiment of the invention shown in FIG. 2*a*.
Figure 2C:
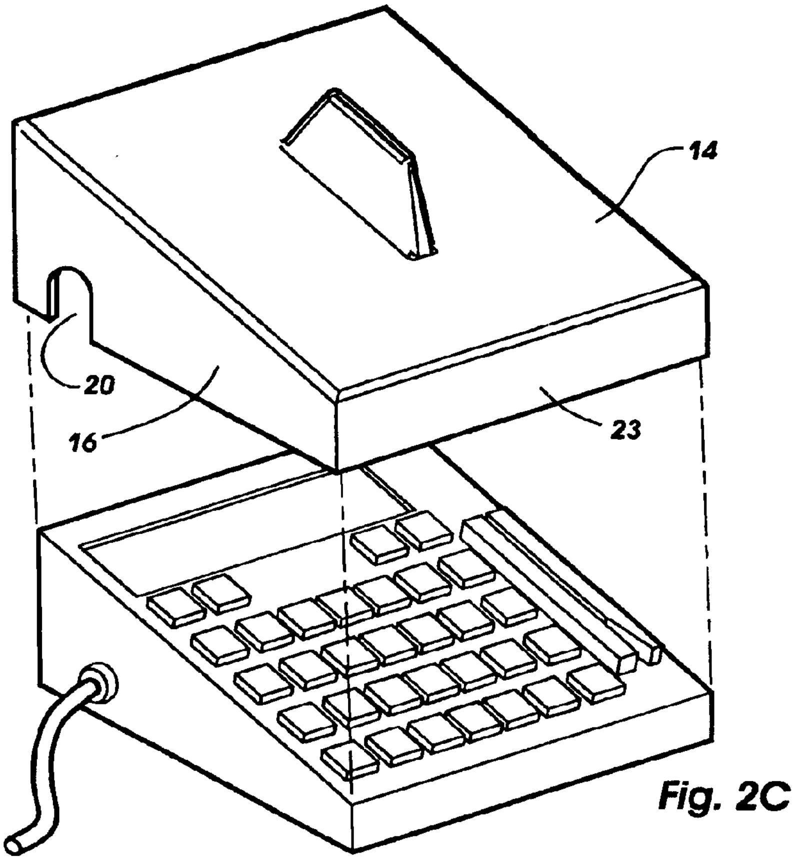
FIG. 2*c* illustrates front view of the embodiment of the invention shown in FIG. 2*a*.
Figure 2D:
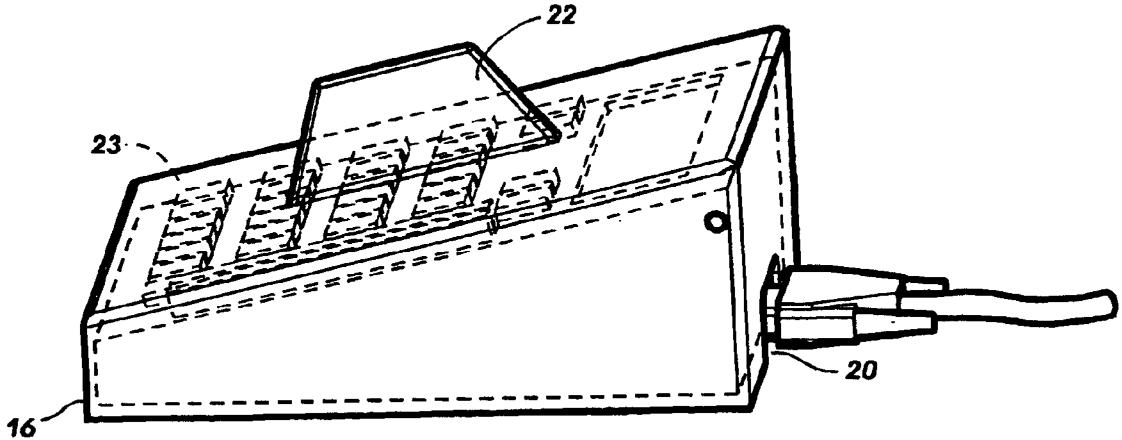
FIG. 2*d* illustrates a side view of the embodiment of the invention shown in FIG. 2*a*.
Figure 2E:
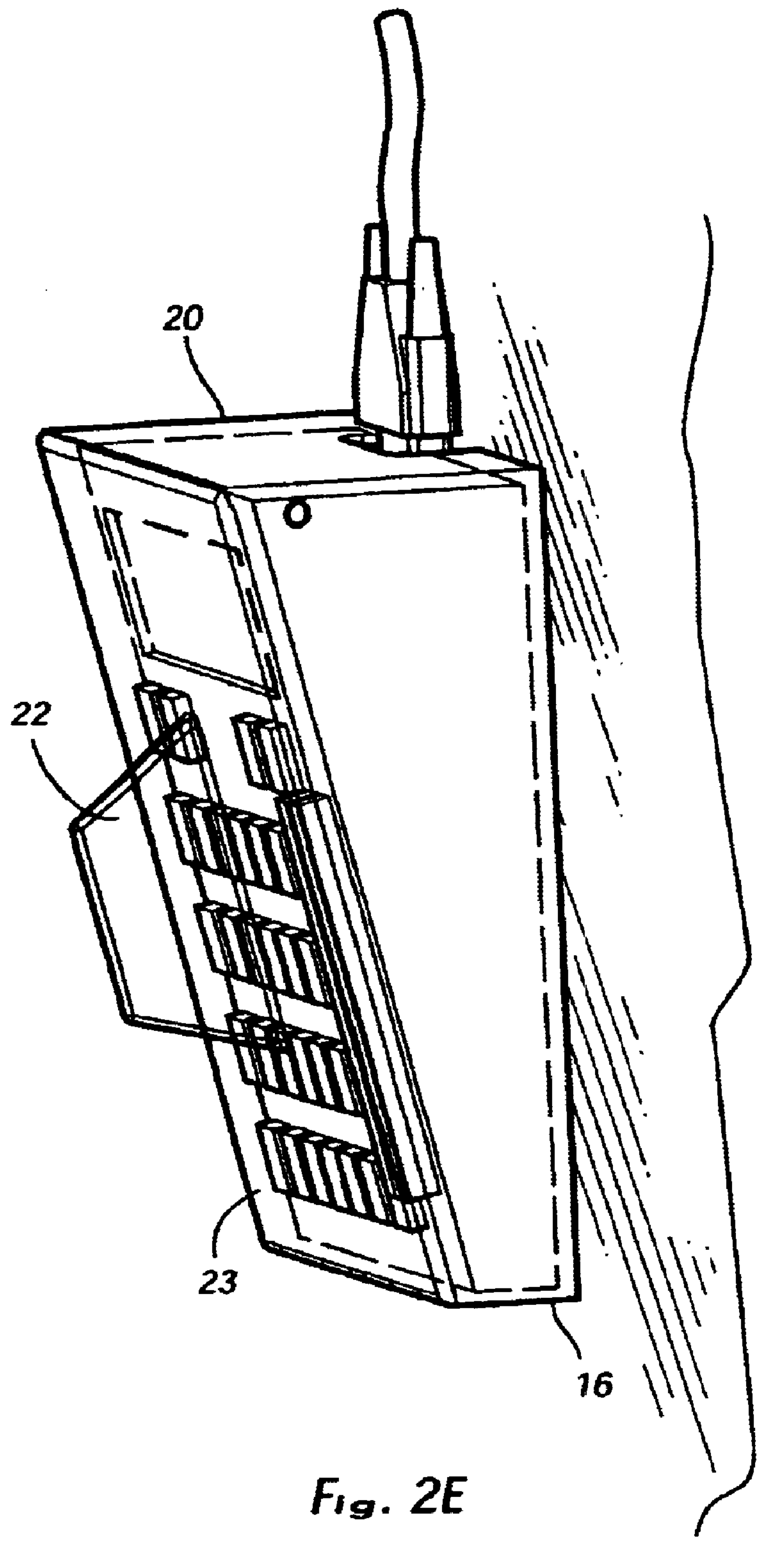
FIG. 2*e* illustrates a side view of the embodiment of the invention shown in FIG. 2*a* mounted on a vertical support surface.

The embodiment shown in FIGS. 1 and 2 are blow molded in a single piece made of rigid transparent nylon or plastic to enable visual inspection of the terminal displays. FIG. 2*a* illustrates a top view of a preferred embodiment of the invention. The cover 12 is a single piece of transparent plastic with the handle 22 incorporated in the single piece design. The rear of the cover 12 has an opening 20 shown in FIG. 2*b* through which terminal cords are connected to the bank card terminal. The front 23 of the cover 12 is shown in FIG. 2*c*. The top side 16 defines another power cord opening 20 and has a top 23 which gradually slopes upward toward the rear opening 20 as shown in FIGS. 2*c* and 2*d*. FIG. 2*e* illustrates a side view of the embodiment of the invention shown in FIG. 2*a* mounted on a vertical support surface.

Figure 3:
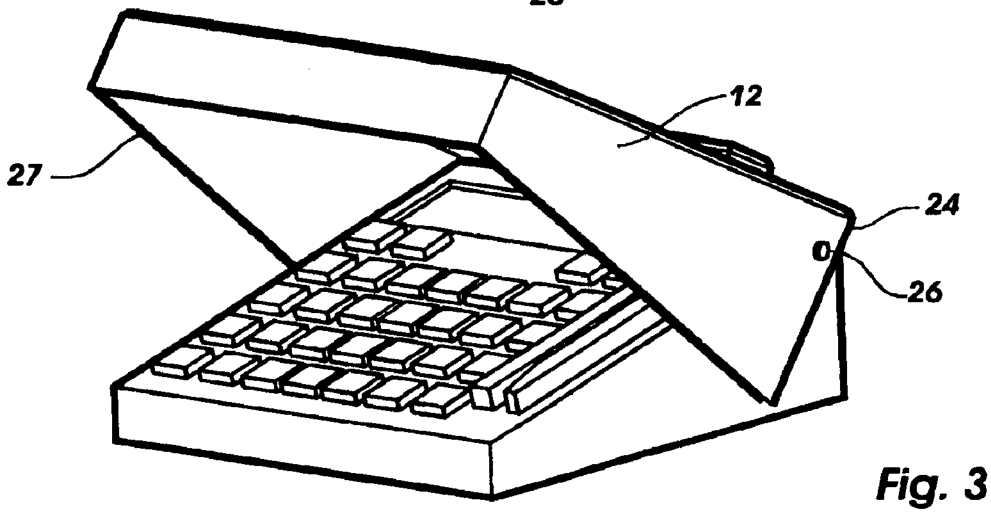
FIG. 3 illustrates another preferred embodiment of the invention.

FIG. 3 illustrates a cover 12 with hinges 24 which attach to a hinge mounting bar 26 attached to the top of the bank card terminal. It opens in a first mode to provide access to a when not in use in a second mode to prevent accidental contact and damage from dust, grime, liquids, and other matter which interfering with the bank card terminal key pad and card reading slot electronics. The perimeter of the sidewalls defining the bottom opening is covered by a shock absorbing seal 27.

FIG. 4 illustrates the cover 12 shown in FIG. 1 adapted with a bottom 28 which is structured to removably seal to the cover 12 to totally encase the bank card terminal FIG. 5 illustrates another encasement variation with a bottom 28 with upstanding walls 30 which are hingedly associated with a hinged cover 12 to open and close as shown. The encased embodiments of FIGS. 4 and 5 are adapted especially for use outdoors to prevent rain damage of the bank card terminal.

Although this specification and referred to the illustrated embodiments, it is not intended to restrict the scope of the appended claims. The claims themselves recite those features deemed essential to the invention.

I claim:

1. A bank card terminal cover for protecting and encasing bank card terminals adapted to be placed on non-integral separate support surfaces and having exterior exposed card reading slots and keyboards pervious to liquids, grease, and dust, and electrical connections, comprising:

a. a rigid, crush resistant, liquid, dust, and grease impervious top having b. a plurality of rigid, crush resistant, liquid, dust and grease impervious sidewalls which define an open bottomed interior chamber sized and structured to fit about and not contact the bank card terminal container such that the cover and sidewalls are supported by the non-integral separate support surface to direct forces, liquids, dust and grease coming into contact with the cover away from the bank card terminal and onto the independent non-integral support surface not apart of the bank card terminal; said sidewalls i. extending sufficiently to contact the non-integral support surface not part of the bank card terminal to elevate the top of the terminal cover above and about the bank card terminal to direct the force from blows to the terminal cover and sidewalls onto the non-integral support surface not part of the bank card terminal, while protecting the bank card terminal from contact with liquids, dust, grease, and falling objects, and ii. having at least one opening through which a terminal cord may be inserted and connected to the bank card terminal and structured such that the bank card terminal cover may be removed and/or positioned in place without disconnecting the terminal cord.

2. A bank card terminal cover according to claim 1, wherein the top is hingedly mounted to the top of the bank card terminal to open in a first mode to provide access to a bank card terminal key pad and card reading slot, and to close in a second mode about the bank card terminal to prevent dust, grime, liquids, and other matter from interfering with the bank card terminal key pad and card reading slot.

3. A bank card terminal cover according to claim 1, including a handle on the top exterior to aid in removal of the top to access the key pad and card slot of said bank card terminal.

4. A bank card terminal cover according to claim 1, wherein the top is transparent.

5. A bank card terminal cover according to claim 1, including a shock absorbing seal affixed to the open bottom of the cover side walls to allow the cover to removably seal to the non-integral support surface.

6. A bank card terminal cover for protecting and encasing bank card terminals adapted to be placed on a vertical non-integral separate support surfaces and having exterior exposed card reading slots and keyboards pervious to liquids, grease, and dust, and electrical connections, comprising:

a. a transparent rigid, crush resistant, liquid, dust, and grease impervious top with b. a plurality of rigid, crush resistant, liquid, dust and grease impervious sidewalls which define an open bottomed interior chamber sized to fit about and not contact the bank card terminal container such that the cover and sidewalls are supported by the non-integral separate support surface to direct contact forces, liquids, dust and grease coming into contact with the cover away from the bank card terminal and onto an independent non-integral support surface not part of the bank card terminal; said sidewalls i. extending sufficiently to contact the non-integral support surface not part of the terminal cover to elevate the top of the terminal cover above and about the bank card terminal to direct the force from blows to the cover and sidewalls onto the non-integral support surface not part of the bank card terminal, while protecting the bank card terminal from contact with liquids, dust, grease, and falling objects, and ii. having at least one opening through which a terminal cord may be inserted and connected to the bank card terminal and structured such that the cover may be removed and/or positioned in place without disconnecting the terminal cord, c. opening structure associated with the top of the bank card terminal and terminal cover to provide access to the bank card terminal keyboard and card reading slot in a first mode, and to close about and secure the bank card terminal in a second mode, and a shock absorbing seal affixed to the edges of the cover sidewalls to seal with the vertical non-integral support surface not part of the bank card terminal.

* * * * *